(12) United States Patent
Larsen et al.

(10) Patent No.: US 8,888,593 B2
(45) Date of Patent: Nov. 18, 2014

(54) DIRECTIONAL INPUT FOR A VIDEO GAME

(75) Inventors: Eric Larsen, Foster City, CA (US); Richard Marks, Pleasanton, CA (US); Anton Mikhailov, Campbell, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 292 days.

(21) Appl. No.: 13/333,786

(22) Filed: Dec. 21, 2011

(65) Prior Publication Data

US 2012/0190448 A1 Jul. 26, 2012

Related U.S. Application Data

(63) Continuation-in-part of application No. 11/588,779, filed on Oct. 26, 2006, now Pat. No. 8,062,126.

(60) Provisional application No. 60/730,659, filed on Oct. 26, 2005.

(51) Int. Cl.
| | |
|---|---|
| *A63F 9/24* | (2006.01) |
| *A63F 13/00* | (2014.01) |
| *G06F 3/03* | (2006.01) |
| *A63F 13/219* | (2014.01) |
| *G06F 3/01* | (2006.01) |
| *A63F 13/20* | (2014.01) |
| *G06F 3/0346* | (2013.01) |
| *G06K 9/00* | (2006.01) |

(52) U.S. Cl.
CPC ............. *A63F 13/06* (2013.01); *G06F 3/0325* (2013.01); *A63F 13/04* (2013.01); *A63F 2300/301* (2013.01); *A63F 2300/1043* (2013.01); *G06F 3/017* (2013.01); *A63F 2300/8076* (2013.01); *A63F 2300/1006* (2013.01); *G06F 3/0346* (2013.01); *A63F 2300/105* (2013.01); *A63F 2300/6045* (2013.01); *A63F 2300/1087* (2013.01); *A63F 2300/1062* (2013.01); *A63F 2300/1093* (2013.01)
USPC .............................................. 463/36; 382/106

(58) Field of Classification Search
None
See application file for complete search history.

(56) References Cited

U.S. PATENT DOCUMENTS

| | | | |
|---|---|---|---|
| 2004/0046736 A1* | 3/2004 | Pryor et al. ................... | 345/156 |
| 2009/0209343 A1 | 8/2009 | Foxlin et al. | |

FOREIGN PATENT DOCUMENTS

WO 2007-078639 7/2007

OTHER PUBLICATIONS

You et al ("Fusion of Vision and Gyro Tracking for Robust Augmented Reality Registration", IEEE 2001).*
You, Suya et al., "Fusion of Vision and Gyro Tracking for Robust Augmented Reality Registration," Proc. IEEE Virtual Reality Conference (2001) (8 pages).
Maidi et al., "A Performance Study for Camera Pose Estimation Using Visual Marker Based Tracking," Machine Vision and Applications (2010) pp. 365-376.

(Continued)

*Primary Examiner* — Amara Abdi
(74) *Attorney, Agent, or Firm* — Martine Penilla Group, LLP

(57) ABSTRACT

A method for providing directional input to a video game is provided. The method initiates with capturing an image of a first object and a second object, the first object and the second object being defined at a fixed distance from each other. A three-dimensional location of the first object is determined based on analysis of the captured image, and a two-dimensional location of the second object is determined based on analysis of the captured image. An input direction for a video game is determined based on the three-dimensional location of the first object and the two-dimensional location of the second object.

20 Claims, 13 Drawing Sheets

(56) References Cited

OTHER PUBLICATIONS

PCT Invitation to Pay Additional Fees (Form PCT/ISA/206) issued in International Application No. PCT/US2012/071386, dated Apr. 4, 2013 (5 total pages).

PCT Notification of Transmittal of the International Search Report and the Written Opinion of the International Searching Authority (Form PCT/ISA/220) issued in International Application No. PCT/US2012/071386, dated Jul. 8, 2013 (1 page); with Search Report (Form PCT/ISA/210) (6 pages), and Written Opinion (Form PCT/ISA/237) (11 pages).

* cited by examiner

DIRECTIONAL INPUT FOR A VIDEO GAME

RELATED APPLICATIONS

This application is a continuation-in-part of U.S. patent application Ser. No. 11/588,779, entitled "SYSTEM AND METHOD FOR INTERFACING WITH A COMPUTER PROGRAM, filed Oct. 26, 2006, now U.S. Pat. No. 8,062, 126, by inventors Richard Marks, Hrishikesh Deshpande, and Gary Zalewski, which claims priority to U.S. Provisional Patent Application No. 60/730,659, entitled "SYSTEM AND METHOD FOR INTERFACING WITH A COMPUTER PROGRAM," filed Oct. 26, 2005, by inventor Richard Marks, and of U.S. patent application Ser. No. 11/429,414, entitled "COMPUTER IMAGE AND AUDIO PROCESSING OF INTENSITY AND INPUT DEVICES FOR INTERFACING WITH A COMPUTER PROGRAM," filed May 4, 2006, by inventors Richard Marks, Xiadong Mao, and Gary Zalewski. This application is related to U.S. patent application Ser. No. 12/259,181, entitled "DETERMINING LOCATION AND MOVEMENT OF BALL-ATTACHED CONTROLLER," filed Oct. 27, 2008, by inventors Anton Mikhailov and Richard Marks. The disclosures of these applications are herein incorporated by reference in their entirety for all purposes.

BACKGROUND

1. Field of the Invention

The present invention relates to methods and systems for providing directional input for a video game.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

It is in this context that embodiments of the invention arise.

SUMMARY

Embodiments of the present invention provide methods and systems for providing directional input to a video game. It should be appreciated that the present invention can be implemented in numerous ways, such as a process, an apparatus, a system, a device or a method on a computer readable medium. Several inventive embodiments of the present invention are described below.

In one embodiment, a method for providing directional input to a video game is provided. The method initiates with capturing an image of a first object and a second object, the first object and the second object being defined at a fixed distance from each other. A three-dimensional location of the first object is determined based on analysis of the captured image, and a two-dimensional location of the second object is determined based on analysis of the captured image. An input direction for a video game is determined based on the three-dimensional location of the first object and the two-dimensional location of the second object.

In one embodiment, determining the three-dimensional location of the first object includes determining a depth of the first object relative to an image capture device configured to capture the image of the first object and the second object. And determining the two-dimensional location of the second object does not include determining a depth of the second object relative to the image capture device.

In one embodiment, the method includes applying the input direction to one or more of the following: controlling the direction of a virtual object within the video game, determining a location on a display, determining a location within a virtual environment, determining a targeting direction, identifying a virtual object, identifying a menu selection.

In one embodiment, the method includes repeating the capturing of the image and the determining of the three-dimensional location of the first object and the two-dimensional location of the second object so as to track the three-dimensional location of the first object and the two-dimensional location of the second object, and further includes repeating the determining of the input direction in accordance with the tracked three-dimensional location of the first object and two-dimensional location of the second object.

In one embodiment, the method includes illuminating the first object and the second object.

In one embodiment, the method includes determining a location of a virtual object in the video game based on the three-dimensional location of the first object.

In one embodiment, determining the three-dimensional location of the first object includes capturing and analyzing inertial data selected from the group consisting of accelerometer data, gyroscope data, and magnetometer data.

In another embodiment, a device is described for providing directional input to a video game. The device includes a housing having a length, a first object positioned at an end of the length of the housing, and a second object positioned along the length of the housing. The first object and the second object are separated from each other by a fixed distance and are configured to be maintained at substantially different depths relative to an image capture device during gameplay of the video game. The device includes an identification module for identifying the device to the video game. Identification of the device enables determination of an input direction based on a tracked three-dimensional location of the first object and a tracked two-dimensional location of the second object.

In one embodiment, the first object and the second object are illuminated.

In one embodiment, the first object and the second object are separated by at least approximately 10 centimeters.

In one embodiment, the first object is connected to a first motion controller, the first motion controller connected to a first receptacle defined at the end of the housing. In a related embodiment, the second object is connected to a second motion controller, the second motion controller connected to a second receptacle defined along the length of the housing. In one embodiment, the device includes a data port for connecting the first motion controller to the identification module.

In one embodiment, the first object and the length of the housing define a longitudinal axis of the device, and the second object is positioned radially outward from the longitudinal axis of the device.

In another embodiment, a peripheral device for providing directional input to a video game is provided. The peripheral device includes a housing and a receptacle defined at an end of the housing, the receptacle configured to receive a motion controller having a first object for tracking. A second object is positioned along a length of the housing, wherein when the motion controller is connected to the receptacle, the first object and the second object are separated by a fixed distance and configured to be maintained at substantially different depths relative to an image capture device during gameplay of the video game. An identification module is provided for identifying the peripheral device to the video game. The identification of the peripheral device enables determination of an input direction based on a tracked three-dimensional location of the first object when present and a tracked two-dimensional location of the second object.

In one embodiment, the first object, when present, and the second object, are illuminated.

In one embodiment, the first object, when present, and the second object, are separated by at least approximately 10 centimeters.

In one embodiment, the peripheral device includes a data port for connecting the motion controller to the identification module.

In one embodiment, the peripheral device includes a peripheral input mechanism defined in the housing, the peripheral input mechanism being mapped to an input mechanism of the motion controller.

In one embodiment, the peripheral device includes a handle for facilitating holding of the peripheral device by a user.

In one embodiment, the first object of the motion controller, when present, and the length of the housing, define a longitudinal axis of the peripheral device, wherein the second object is positioned radially outward from the longitudinal axis of the peripheral device.

In another embodiment, a peripheral device for providing directional input to a video game is provided. The peripheral device includes a housing, a first receptacle defined at an end of the housing, the first receptacle configured to receive a first motion controller having a first object for tracking, and a second receptacle defined along a length of the housing, the second receptacle configured to receive a second motion controller having a second object for tracking. When the first motion controller is connected to the first receptacle, and when the second motion controller is connected to the second receptacle, the first object and the second object are separated by a fixed distance and configured to be maintained at substantially different depths relative to an image capture device during gameplay of the video game. The peripheral device includes an identification module for identifying the peripheral device to the video game. Identification of the peripheral device enables determination of an input direction based on a tracked three-dimensional location of the first object when present and a tracked two-dimensional location of the second object when present.

In one embodiment, the first object, when present, and the second object, when present, are illuminated.

In one embodiment, the first object, when present, and the second object, when present, are separated by at least approximately 10 centimeters.

In one embodiment, the peripheral device includes a first data port for connecting the first motion controller to the identification module, and a second data port for connecting the second motion controller to the identification module.

In one embodiment, the peripheral device includes a peripheral input mechanism defined in the housing, the peripheral input mechanism being mapped to an input mechanism of the first or second motion controller, when present.

In one embodiment, the peripheral device includes a handle for facilitating holding of the peripheral device by a user.

In one embodiment, the first object of the first motion controller, when present, and the length of the housing, define a longitudinal axis of the peripheral device. The second receptacle is configured to position the second object of the second motion controller, when present, radially outward from the longitudinal axis of the peripheral device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and apparatus for interfacing with an interactive program.

It will be obvious, however, to one skilled in the art, that the present invention may be practiced without some or all of these specific details. In other instances, well known process operations have not been described in detail in order not to unnecessarily obscure the present invention.

Figure 1:
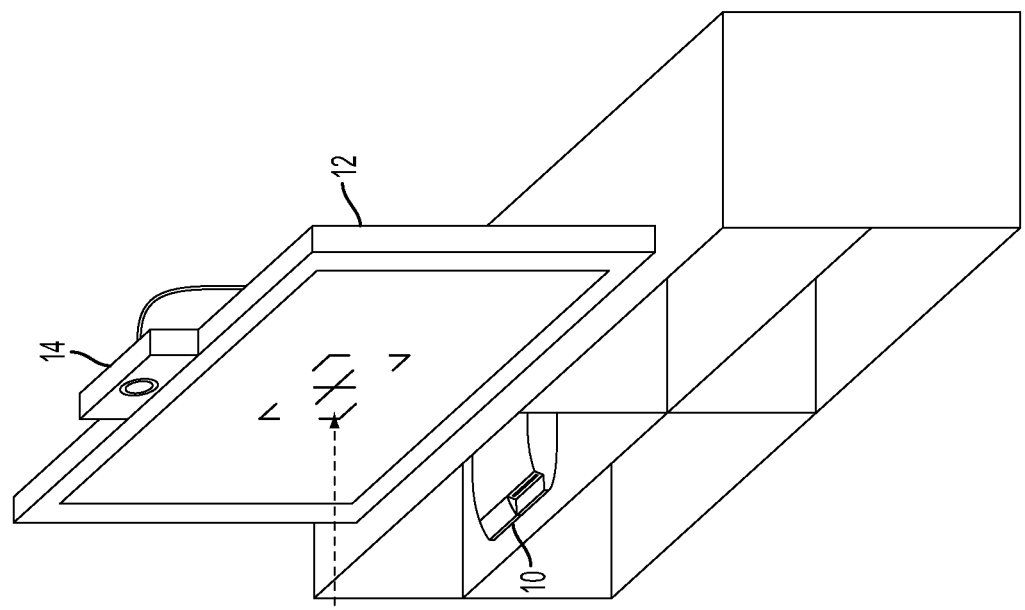
FIG. 1 illustrates a user operating a device for providing directional input to a video game in a gaming environment, in accordance with an embodiment of the invention.
Figure 1:
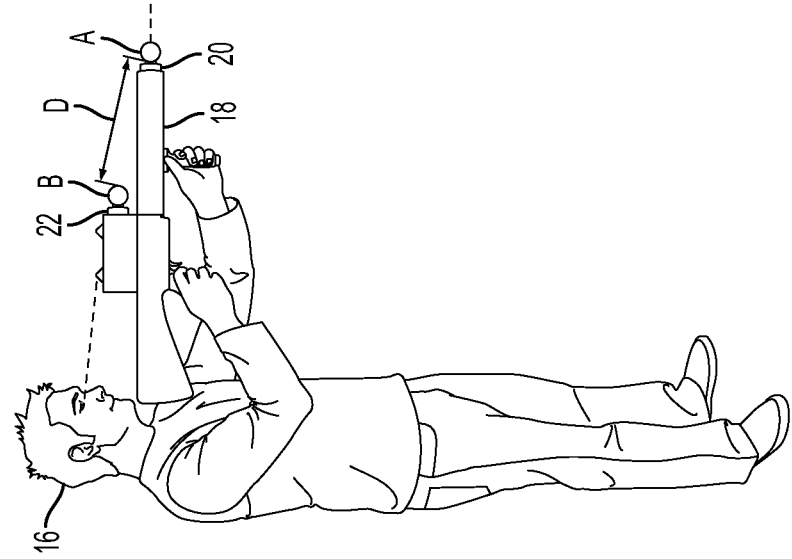

FIG. 1 illustrates a user operating a device for providing directional input to a video game in a gaming environment, in accordance with an embodiment of the invention. As shown, a computing system 10 executes an interactive video game, and renders the video game on a display 12. It will be appreciated that the computing system 10 may be any of various types of devices capable of executing a video game, such as a video game console, personal computer (PC), home theater PC, general purpose computer, set-top box, or other types of computing devices which may be configured to execute and render a video game on a display. One example of a gaming console is the Playstation 3 console manufactured by Sony Computer Entertainment Inc. The display 12 may be any of various types of displays capable of visually rendering a video game, such as a monitor or television utilizing any of various types of display technologies, such as LCD, plasma, and DLP technologies. Though not specifically shown, the display 12 may also utilize a projector which projects an image onto a display screen, wall, or other flat surface for viewing.

An image capture device 14 captures images from the video gaming environment. In one embodiment, the image capture device 14 is an RGB camera that captures RGB values for pixels of an image. In one embodiment, the image capture device 14 is a depth camera capable of capturing depth values for pixels of an image.

A user 16 operates a peripheral device 18, which is utilized to provide directional input to the video game. The peripheral device 18 is configured to receive a first motion controller 20 having a tracking object A, and a second motion controller 22 having a tracking object B. As shown, the peripheral device 18 holds the first and second motion controllers so that the tracking objects A and B are maintained at a fixed distance D from one another. Furthermore, the peripheral device 18 is configured so that the tracking objects A and B maintained at substantially different depths relative to the image capture device 14 during gameplay of the video game. One example of a motion controller is the Playstation Move motion controller manufactured by Sony Computer Entertainment Inc.

During gameplay of the video game, the image capture device 14 captures images from the gaming environment. These images are analyzed to determine and track the locations of the tracking objects A and B. In one embodiment, the motion controllers 20 and 22 can include additional motion sensors such as accelerometers, magnetometers, and gyroscopes. The data from these sensors can also be utilized to determine and track the locations of the tracking objects A and B. Based on the determined locations of the tracking objects, a directional input is determined and provided to the video game.

The directional input correlates to a direction towards which the peripheral device 18 is pointed by the user 16. In some embodiments, this correlation may be exact, such that a change in the direction of the peripheral device produces a change in the directional input of the precise same amount. In other embodiments, the correlation may vary by a constant or variable amount. For example, the correlation between the direction of the peripheral device and the directional input may be scaled so as to be magnified or diminished depending on the context of the video game or the specific application for which the directional input is to be applied. In one embodiment, the scaling may vary depending on where the peripheral device is directed, so that the scaling is different for different directional regions that the peripheral device is directed towards. In one embodiment, the specific correlation may vary depending on a mode of the video game. For example, the scaling of the correlation may be triggered to change when activating a targeting mode in the video game.

Figure 2A:
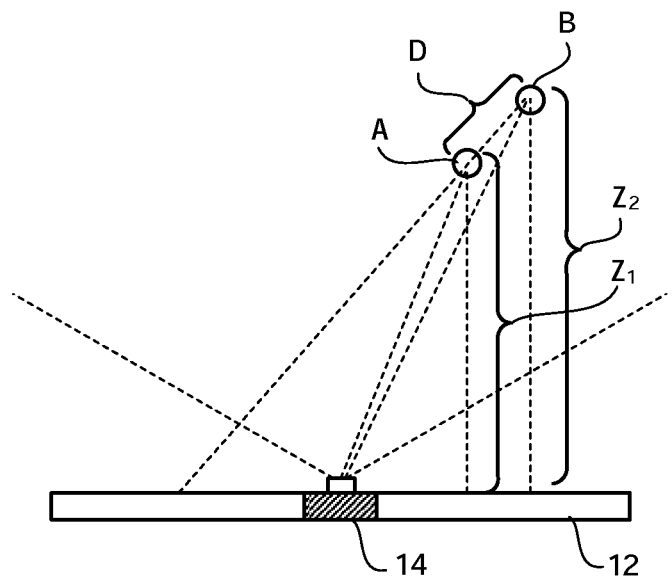
FIG. 2A illustrates an overhead view of the tracking objects A and B in relation to the display 12, in accordance with an embodiment of the invention.
Figure 2B:
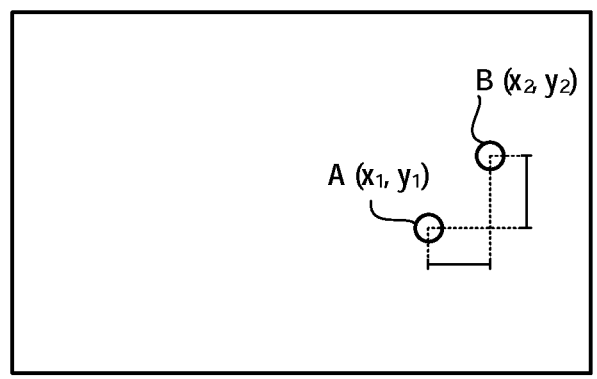
FIG. 2B illustrates an image captured by an image capture device, when tracking objects are positioned as defined in FIG. 2A.

FIG. 2A illustrates an overhead view of the tracking objects A and B in relation to the display 12, in accordance with an embodiment of the invention. As previously discussed, the tracking objects are separated by a fixed distance D, as the peripheral device holds the motion controllers in their respective positions. In the illustrated embodiment, the tracking object A is positioned at a depth Z relative to the image capture device 14 and the display 12. FIG. 2B illustrates an image captured by the image capture device 14, when the tracking objects A and B are positioned as defined in FIG. 2A. In one embodiment, the three-dimensional location of the tracking object A is determined and tracked. This can be accomplished based on analysis of the captured image as well as additional motion sensor data. In one embodiment, the three-dimensional location of the tracking object A is defined according to an x-y-z coordinate space, wherein the x and y axes are approximately parallel to the image plane of the image capture device, and the z axis is approximately perpendicular to the image plane and therefore denotes depth relative to the image capture device. As noted, the x, y, and z coordinates of the tracking object A are determined based on analysis of the captured image as well as additional motion sensor data. In the illustrated embodiment, the tracking object A has coordinates $(x_1, y_1, z_1)$.

Since the distance D between the tracking objects A and B is a fixed known quantity, once the three-dimensional location of the tracking object A is determined, it is then possible to determine the location of the tracking object B utilizing only two-dimensional data about tracking object B. In the illustrated embodiment, the x and y coordinates of the tracking object B can be determined based on analysis of the captured image alone, while the z coordinate can be determined based on this data plus the known three-dimensional location coordinates of the tracking object A and the known fixed distance between tracking objects A and B. The specific calculations required to determine the z coordinate of the tracking object B will be apparent to those skilled in the art and are therefore not discussed here. In the illustrated embodiment, the tracking object B has coordinates ($x_2$, $y_2$, $z_2$).

As the location of the tracking object B can be determined as described above, it will also be apparent that the specific orientation of the peripheral device (i.e. the direction in which it is being pointed by the user) can be determined from the three-dimensional location of the tracking object A, the two-dimensional location of the tracking object B, and the known fixed distance between the tracking objects A and B. The specific calculations for determining the orientation of the peripheral device will depend upon the peripheral device's particular design, and will be apparent to those skilled in the art.

Based on the determined orientation of the peripheral device in three-dimensional space and its location (known from the three-dimensional location of tracking object A), the direction in which the peripheral device is being pointed by the user can be defined with precision. For example, it can be determined that the user is pointing the peripheral device at a specific portion of the display, or a portion which lies outside of the display region. The determined direction of the peripheral device can be utilized to define an input direction for the video game. In various embodiments, the input direction can be utilized by the video game in various ways. For example, in one embodiment, the input direction controls a direction of a virtual object in the video game, such as a weapon or other virtual object. In one embodiment, the input direction controls the location of a targeting reticle 24 rendered as part of the video game on the display 12. In another embodiment, the input direction controls the location of a cursor, pointer, selection tool, brush, pen or any other type of indicator which provides visual indication of the location at which a specified function may be performed. In various other embodiments, the input direction can be utilized to control the location or direction or any type of virtual object or visual indicator. Examples include the following: controlling the direction of a virtual object within the video game, determining a location on a display, determining a location within a virtual environment, determining a targeting direction, determining a direction of travel in a virtual environment, identifying a virtual object, and identifying a menu selection.

As explained, the direction of the peripheral device can be determined by the console based on the known distance D for the peripheral device. The distance D can be determined based on identification of a known peripheral (e.g. performing a lookup of the peripheral device's ID in an online database) or by having the distance stored in the peripheral device and communicated to the console, by way of example and not limitation.

Figure 3:
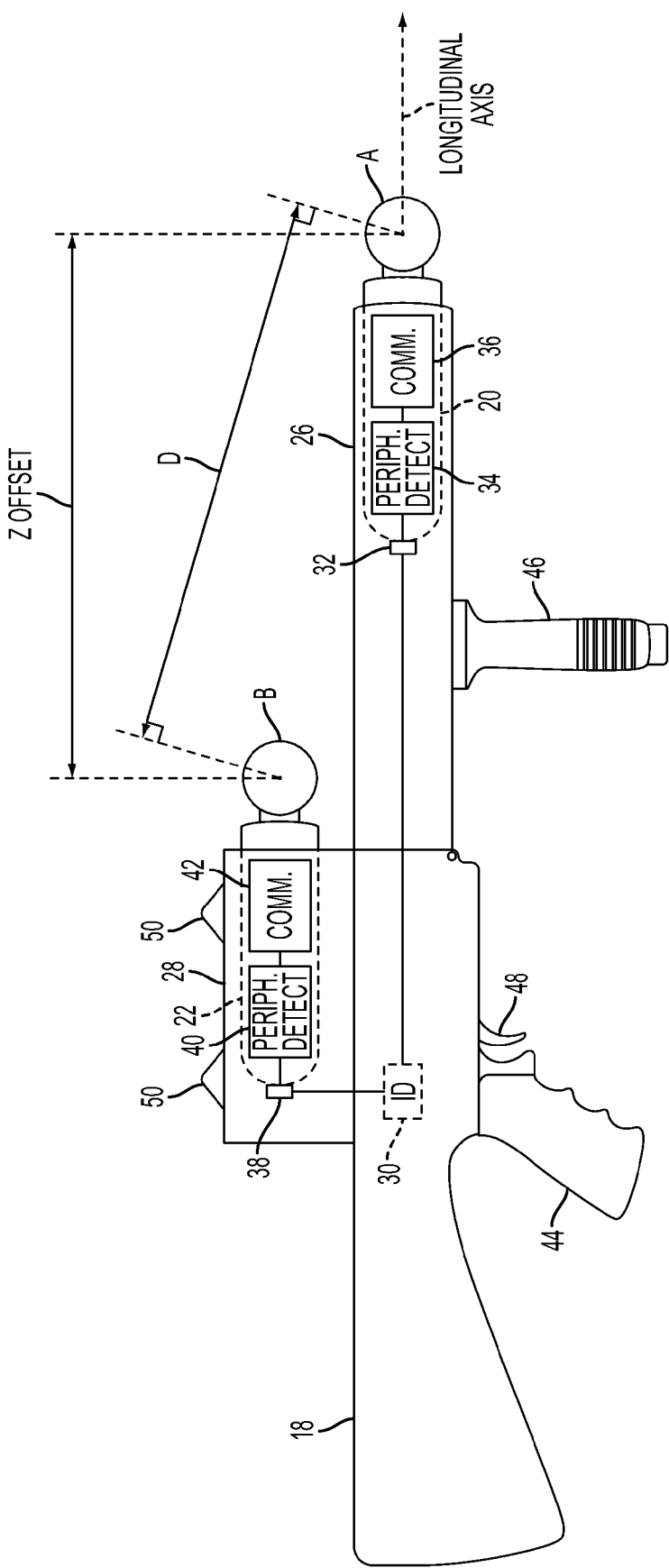
FIG. 3 illustrates the peripheral device for providing direction input to a video game, in accordance with an embodiment of the invention.

FIG. 3 illustrates the peripheral device 18 for providing direction input to a video game, in accordance with an embodiment of the invention. As shown, the peripheral device 18 includes a first receptacle 26 for receiving the first motion controller 20 and a second receptacle 28 for receiving the second motion controller 22. The peripheral device 18 includes an identification module 30 which facilitates identification of the peripheral device 18 to the first and second motion controllers and to the video game. When connected to the first receptacle 36, the first motion controller 20 connects to a first data port 32 to enable the first motion controller 20 to communicate with the identification module 30. The first motion controller 20 includes a peripheral detection module 34 that detects its connection to the peripheral device based on its communication with the identification module 30. This information is transmitted via a communications module 36 in the first motion controller 20 to the video game. Thus the connection of the first motion controller 20 to the peripheral device 18 is established for purposes of interactivity with the video game.

In a similar manner, the second motion controller 22 connects to a second data port 38 that facilitates communication between the second motion controller 22 and the identification module 30. The second motion controller 22 includes a peripheral detection module 40 that detects its connection to the peripheral device 18 based on its communication with the identification module 30. The connected status of the second motion controller 22 to the peripheral device 18 is communicated via communications module 42 within the second motion controller 22 to the video game. As such, the connection and association of the first and second motion controllers to the peripheral device 18 is established for interactivity with the video game.

As shown, when the first and second motion controllers are seated within the first and second receptacles, respectively, their respective tracking objects A and B are separated by a fixed distance D. A longitudinal axis of the peripheral device 18 is defined along the length of the peripheral device. The tracking object A is positioned along the longitudinal axis, whereas the tracking object B is positioned radially outward from the longitudinal axis. In this manner, the tracking object B is less likely to be occluded by tracking object A during interactivity as they are being captured by the image capture device. In addition to being radially offset relative to the longitudinal axis of the peripheral device, the tracking objects A and B are positioned to have a depth offset (Z offset) relative to the image capture device during gameplay. In some embodiments, this depth offset is greater than approximately 10 centimeters. In other embodiments, the depth offset is less than approximately 10 centimeters. It will be appreciated that the longer the depth offset, the less directional change is indicated by a given change in the relative lateral (x/y) positioning of the tracking objects. Whereas, the shorter the depth offset, the more directional change is indicated by a given change in the relative lateral positioning of the tracking objects. Thus, a longer depth offset will generally enable more sensitive detection of direction, as for a given change in direction, the longer depth offset will provide for a greater change in the lateral positioning of the tracking objects relative to each other than would a shorter depth offset configuration.

The peripheral device 18 additionally includes handles 44 and 46 to facilitate holding of the peripheral device 18 by the user. A trigger 48 maps to a trigger or button of one of the motion controllers, and thereby provides input to the video game. In other embodiments, the peripheral device may include any of various other buttons, triggers, or other input devices which may map to input devices of the motion controllers. In other embodiments, the peripheral device may include additional input devices that do not map to input devices of the motion controllers. Such input devices may be configured to communicate input to the video game via the communications modules of the motion controllers.

It will be appreciated that though peripheral device 18 has generally been depicted as being shaped like a gun, the peripheral device 18 may have any of various other types of shapes or forms which provide for the depth offset and radial separation of the tracking objects of the motion controllers, when attached to the peripheral device.

Figure 4:
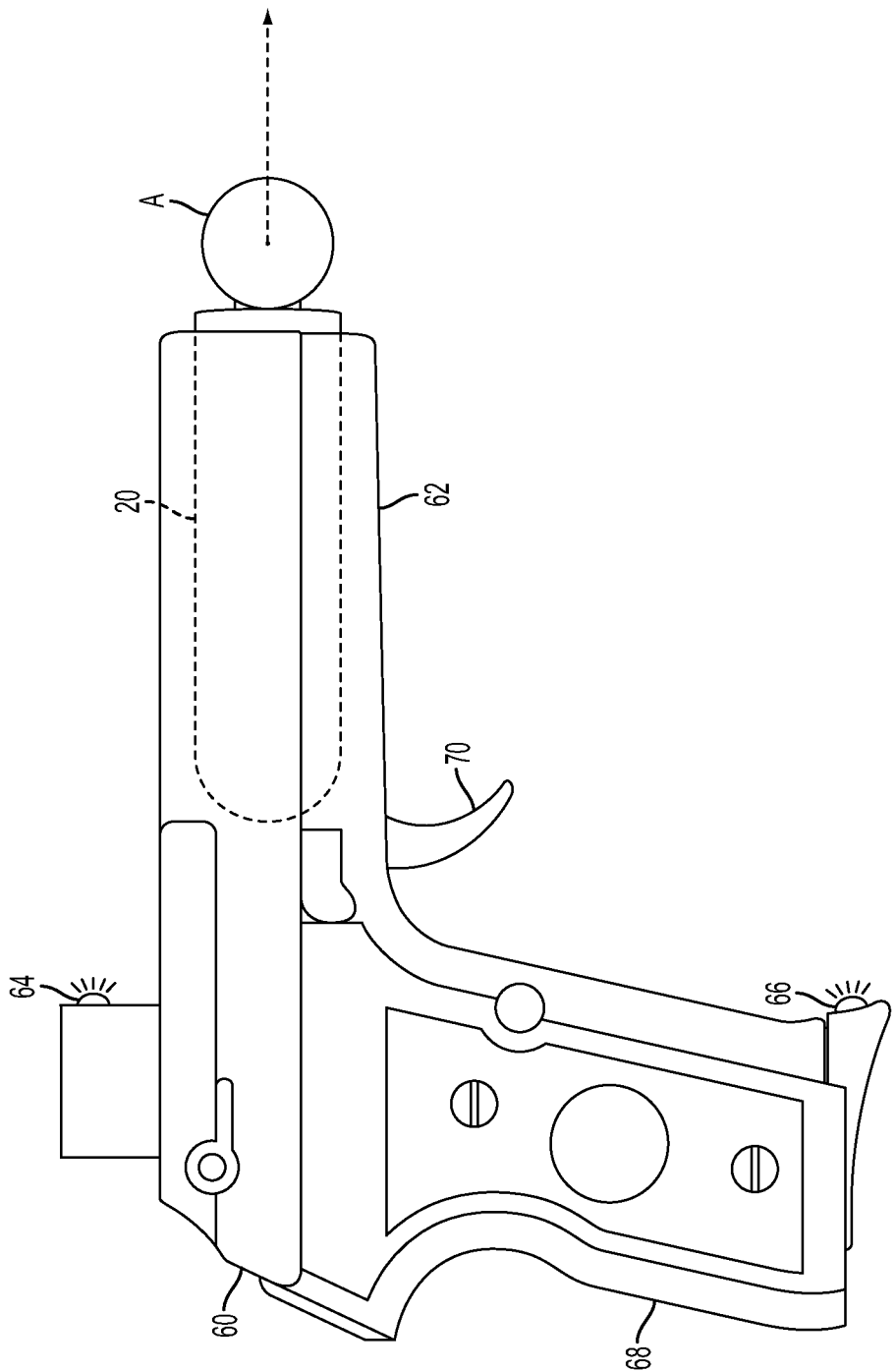
FIG. 4 illustrates a peripheral device 60 for providing directional input to a video game, in accordance with an embodiment of the invention.

FIG. 4 illustrates a peripheral device 60 for providing directional input to a video game, in accordance with an embodiment of the invention. As shown, the peripheral device 60 is shaped like a pistol, and includes a receptacle 62 for receiving a motion controller 20 having a tracking object A that can be illuminated from within. During operation as a directional input device, only the three-dimensional location of the tracking object A is tracked. A secondary tracking object 64 is positioned so that during usage of the peripheral device for interactivity with the video game, the secondary tracking object 64 is located at a different depth relative to the tracking object A of the motion controller 20. As the secondary tracking object 64 is only tracked in two dimensions, excluding depth, the secondary tracking object 64 need not be sized to enable depth determination based on its appearance in images captured by the image capture device. The secondary tracking object 64 can be minimally sized provided it is recognizable and able to be tracked based on image analysis of images captured by the image capture device. In one embodiment, the secondary tracking object 64 is a light, and may include a light source such as an LED. The secondary tracking object is laterally offset from the tracking object A relative to the image capture device in order to prevent the tracking object A from occluding the secondary tracking object relative to the image capture device.

In the illustrated embodiment, the secondary tracking object 64 is mounted above the level of the tracking object A; however, in other embodiments, the secondary tracking object 64 may located elsewhere on the peripheral device 60, provided the secondary tracking object 64 has a depth offset compared to the tracking object A, and is positioned so as not be occluded by the tracking object A or any other componentry during gameplay. In some embodiments, the peripheral device 60 includes additional tracking objects, such as tracking object 66, which may also be a light. By including multiple tracking objects, it is possible to provide for more robust tracking as not all of the tracking objects are likely to be occluded at any one time. Though in the illustrated embodiment, tracking objects are shown mounted at the top and bottom of the peripheral device 60, it will be appreciated that in other embodiments, one of more tracking objects may be mounted at other locations such as on the sides of the peripheral device 60.

The tracking object A of the motion controller 20 and the secondary tracking object 64 are separated by a fixed distance. As such, the direction in which the peripheral device 60 is pointed can be tracked based on tracking the three-dimensional movement of the tracking object A and tracking only the two-dimensional lateral movement of the secondary tracking object 64 relative to the image capture device.

Additionally, the peripheral device 60 includes a handle 68 for holding the peripheral device. Also, a trigger 70 is provided, which in one embodiment is mapped to an input mechanism of the motion controller 20.

Figure 5:
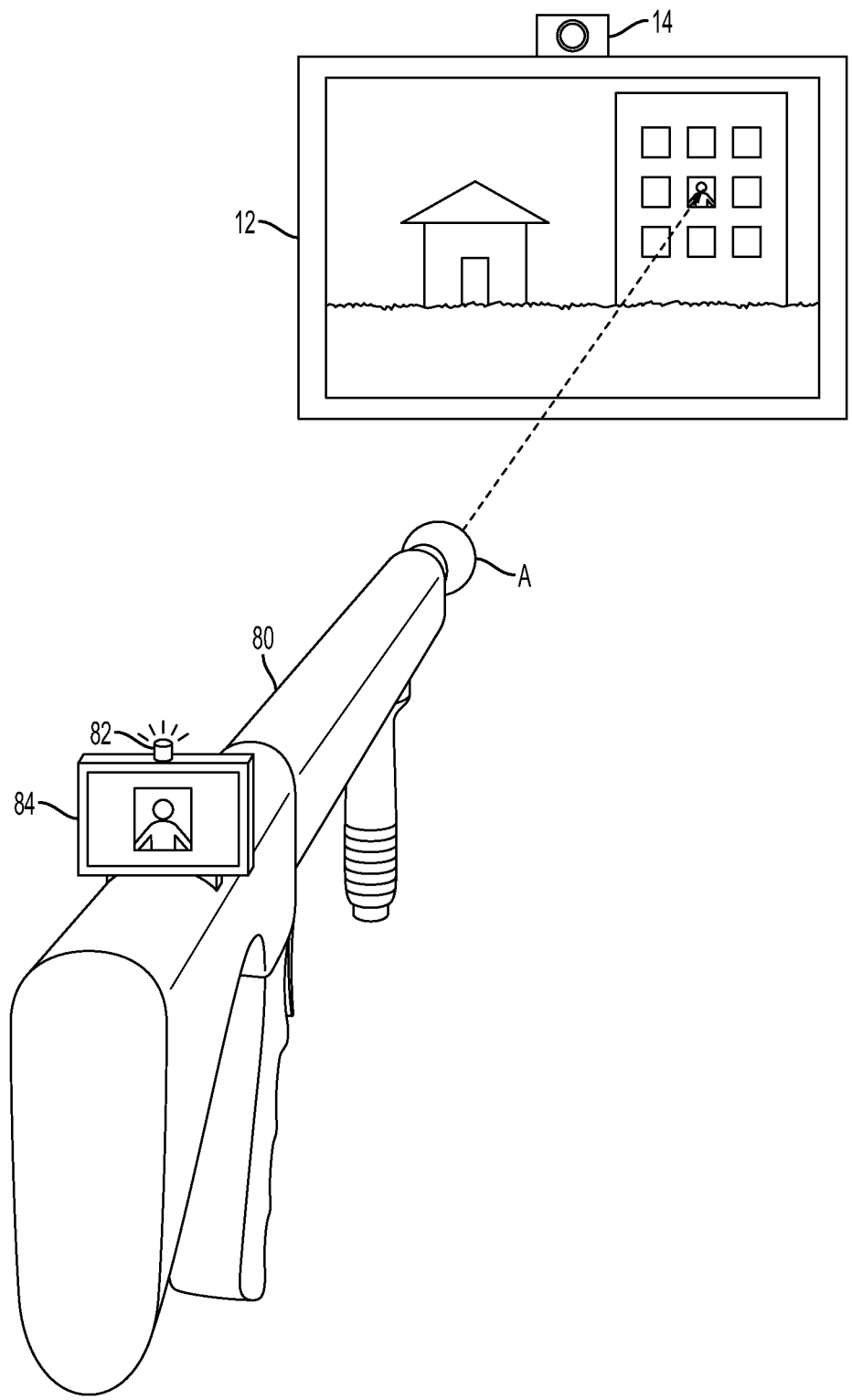
FIG. 5 illustrates a peripheral device for providing directional input to a video game, in accordance with an embodiment of the invention.

FIG. 5 illustrates a peripheral device for providing directional input to a video game, in accordance with an embodiment of the invention. As shown, the peripheral device 80 is utilized in a vicinity of a display 12, upon which the video game is rendered. The peripheral device 80 includes a receptacle for receiving a motion controller having tracking object A. The peripheral device 80 also includes a light 82 which functions as a secondary tracking object. An image captured device 14 captures an image stream of the game environment, including the peripheral device 80. The image stream is analyzed to determine and track the locations of the tracking object A and the light 82. Based on the three-dimensional location of the tracking object A and the two-dimensional lateral location of the light 82 relative to the image capture device 14, the directional orientation of the peripheral device 80 is determined. Thus, it can be determined that the peripheral device 80 is being aimed at a particular portion of the scene of the video game rendered on the display 12. In the illustrated embodiment, it is determined that the peripheral device 80 is being aimed at a window of a building in the rendered scene of the video game.

Additionally, in one embodiment, the peripheral device 80 includes a display 84 which can be configured to display various types of images, video or other data related to the video game. For example, in one embodiment, the peripheral device 80 is configured to provide a magnified view of a portion of the scene of the video game rendered on the display 84, towards which the peripheral device 80 is determined to be pointing. In this manner, the user is able to enjoy a more detailed view of objects of the video game rendered on the display 12, which facilitates more precise targeting of the objects of the video game. In one embodiment, the peripheral device 80 communicates wirelessly with a console device executing the video game, and receives a video feed from the video game that is rendered on the display 84 of the peripheral device 80 to thereby display the magnified view to the user.

Figure 6:
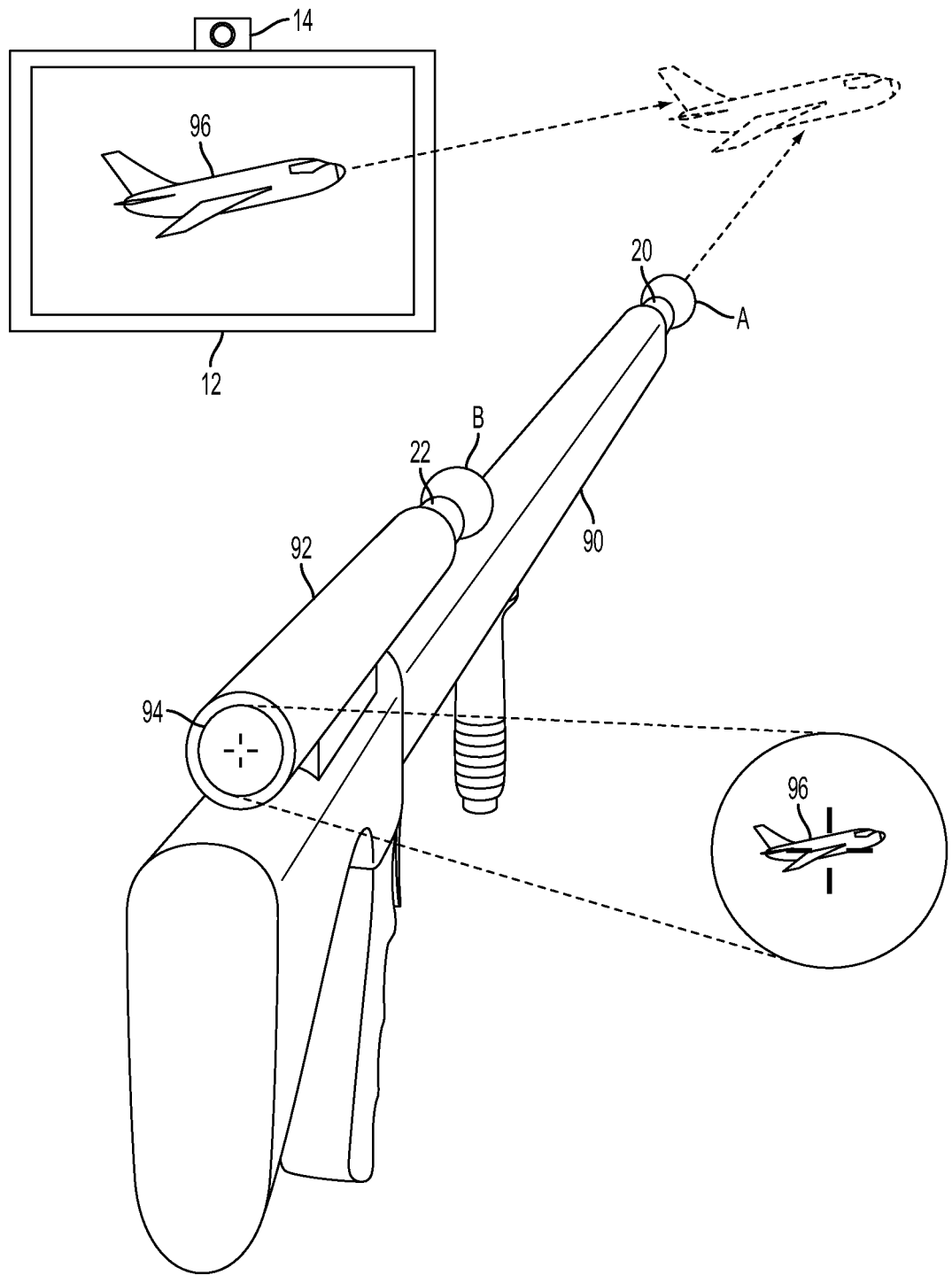
FIG. 6 illustrates a peripheral device 90 for providing directional input to a video game, in accordance with an embodiment of the invention.

FIG. 6 illustrates a peripheral device 90 for providing directional input to a video game, in accordance with an embodiment of the invention. The peripheral device 90 is configured to receive first and second motion controllers having tracking objects A and B, respectively. The directional orientation of the peripheral device 90 during gameplay is determined in accordance with the principles described herein, and is based on the three-dimensional location of the tracking object A and the two-dimensional lateral location of the tracking object B relative to the image capture device 14.

The peripheral device 90 additionally includes a virtual sighting scope 92 which provides a view of the virtual environment of the video game when the user looks into the scope 92. In one embodiment, the sighting scope 92 includes an internal display (not shown) in the interior of the scope 92 and a lens 94 which enables the user to view the image shown on the internal display when the user's eye is positioned proximate to the lens 94 of the scope 92. As with the embodiment described with reference to FIG. 5, the scope 92 can be configured to display a corresponding magnified view of the scene of the video game shown on the display 12 when the peripheral device 90 is aimed at a region of the display 12.

Furthermore, in one embodiment, the peripheral device 90 can be configured to provide viewing of portions of the virtual environment of the video game beyond what is visible via the display 12. By way of example, in the illustrated embodiment, the peripheral device 90 has been utilized to track an object 96 as it moves from a location within the virtual environment of the video game that is visible on the display 12 to a location that lies beyond the region that is visible on the display 12. As the direction of the peripheral device 90 moves from being directed at a point within the display 12 to a point outside of the display, the view shown through the scope 92 continues to display a magnified view of the virtual environment in a seamless manner. To accomplish this, the location and direction of the peripheral device 90 is continually mapped to a location and direction of a virtual viewpoint within the virtual environment. The view of the virtual environment shown on the scope 92 is thus a view from the virtual viewpoint that has been mapped to the peripheral device 90. The mapping of the direction and location of the peripheral device 90 is coordinated with the view of the virtual environment shown on the display 12 so that the two are consistent with each other, so that when the peripheral device 90 is aimed at a point on the display 12, the view shown by the peripheral device's scope 92 matches that shown by the display 12 (but may be a magnified view in the same direction within the virtual environment).

Figure 7:
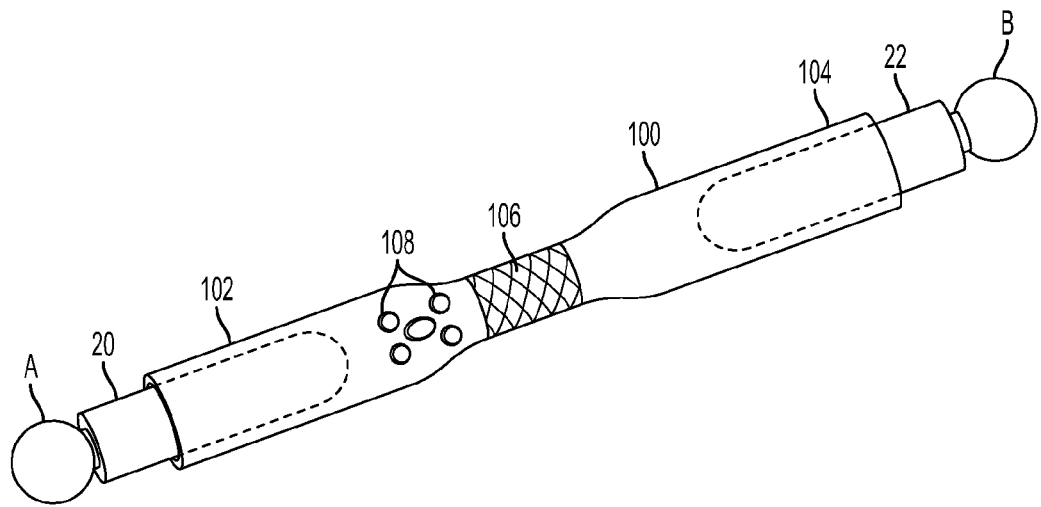
FIG. 7 illustrates a peripheral device for providing directional input to a video game, in accordance with an embodiment of the invention.

FIG. 7 illustrates a peripheral device for providing directional input to a video game, in accordance with an embodiment of the invention. The peripheral device 100 includes a first and second receptacles 102 and 104 for receiving first and second motion controllers 20 and 22, respectively. The peripheral device 100 is generally an elongated structure configured so that the tracking objects A and B of the motion controllers 20 and 22, respectively, are positioned at opposite ends of the peripheral device 100. The peripheral device 100 includes a handle portion 106 positioned along the length of the device at or near its central portion. The handle portion 106 can be textured, contoured, or include various kinds of materials such as rubber-based or other types of compliant materials as are known in the art to facilitate secure gripping of the peripheral device 100 by a user's hand. The peripheral device 100 also includes various buttons 108 which in one embodiment are mapped to buttons on either or both of the motion controllers 20 or 22. It will be appreciated that the peripheral device 100 can include other types of input mechanisms that may or may not be mapped to input mechanisms present on either or both of the motion controllers.

Figure 8:
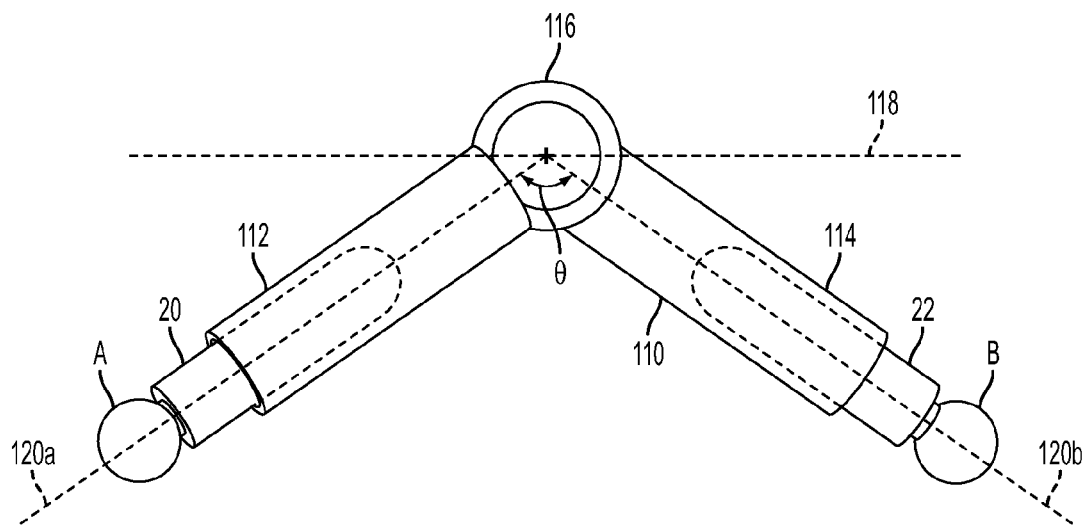
FIG. 8 illustrates a peripheral device for providing directional input to a video game, in accordance with an embodiment of the invention.

FIG. 8 illustrates a peripheral device for providing directional input to a video game, in accordance with an embodiment of the invention. As shown, the peripheral device 110 includes a first arm 112 having a receptacle for a first motion controller 20 and a second arm 114 having a receptacle for a second motion controller 22. The first arm 112 and the second arm 114 are connected by a joint 116, which enables the first arm and the second arm to rotate about the joint into various locked positions. For example, in one embodiment, the joint 116 is configured to provide for a straight orientation wherein the first arm 112 and the second arm 114 are aligned with each other along an axis 118, and a bent orientation wherein the first arm 112 is aligned along an axis 120a and the second arm 114 is aligned along an axis 120b so that the first and second arms are oriented at an angle θ relative to each other. It will be appreciated by those skilled in the art, that in various embodiments, the angle θ may vary, and further there may be more than two locking positions which provide for various angles between the first and second arms.

Figure 9:
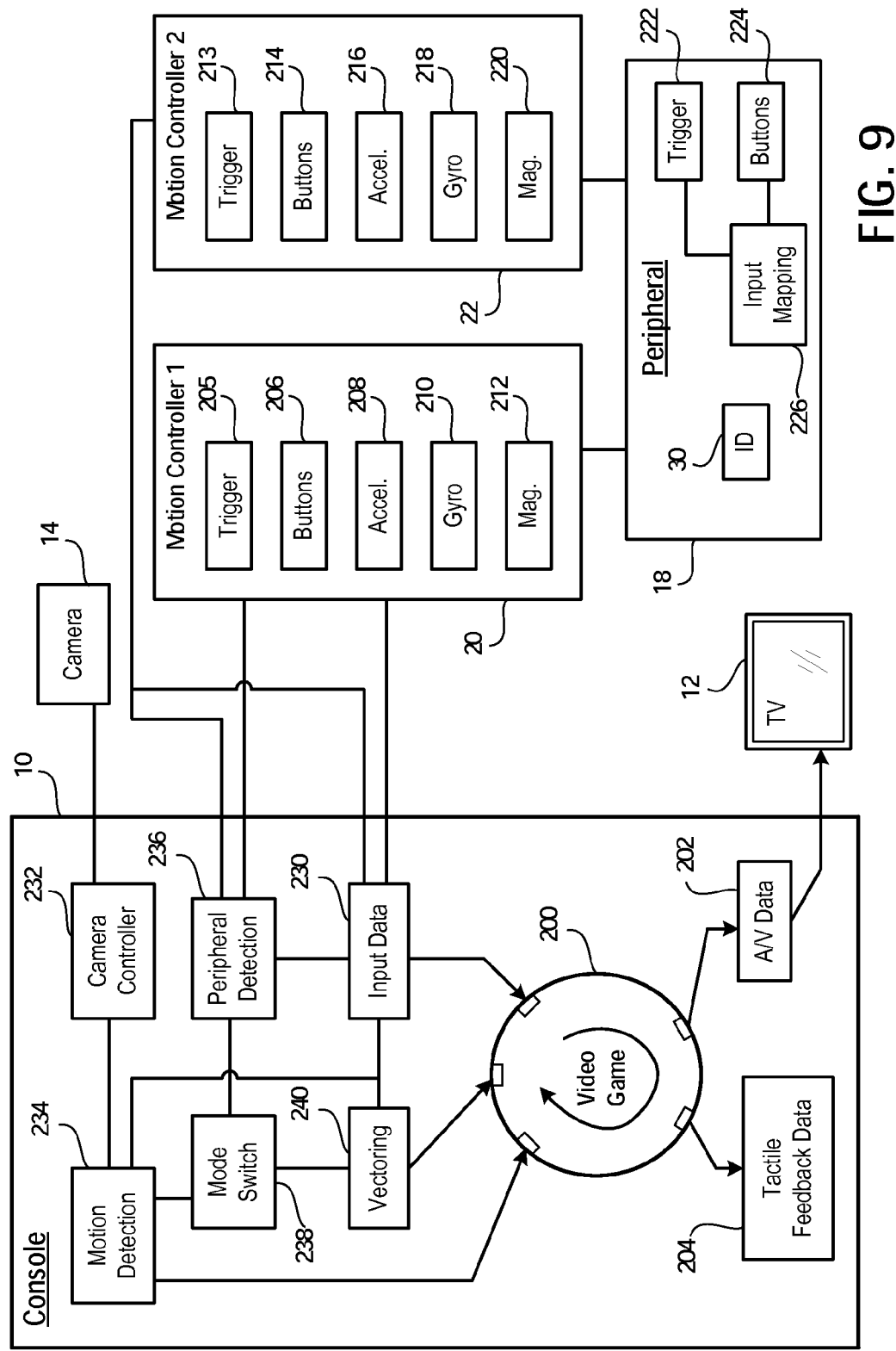
FIG. 9 illustrates a system for providing directional input to a video game, in accordance with an embodiment of the invention.

FIG. 9 illustrates a system for providing directional input to a video game, in accordance with an embodiment of the invention. A console device 10 executes a video game 200 which receives inputs from motion controllers 20 and 22, and which provides output in the form of audio/video data 202 which is sent to display 12, and tactile feedback data 204 which is sent to the motion controllers to cause vibrotactile feedback at the motion controllers. Each of the motion controllers respectively includes various input mechanisms, such as triggers 205 and 213, buttons 206 and 214, as well as motion sensors such as accelerometers 208 and 216, gyroscopes 210 and 218, and magnetometers 212 and 220.

The motion controllers are connected to a peripheral device 18 which includes an identification module 30 for identifying the peripheral device 18 to the console device 10 and to the video game 200. The peripheral device 18 also can include input mechanisms such as trigger 222 and buttons 224 which may be mapped via input mapping module 226 to corresponding input mechanisms on one or both of the motion controllers.

During normal usage of the motion controllers 20 and 22 as separate motion controllers, a camera controller 232 controls a camera 14 which captures an image stream of the motion controllers. A motion detection module 234 determines the location and orientation of the motion controllers based on image analysis of the image stream to detect the motion controllers' respective tracking objects as well as input data 230 from the motion sensors of the motion controllers. The location and orientation data of the motion controllers are provided as input to the video game, which executes changes in its state accordingly.

However, when the motion controllers are connected to the peripheral device 18, a peripheral detection module 236 detects this connection, which may be communicated by one or both of the motion controllers, and triggers a mode switch 238 which activates a vectoring module 240. The vectoring module detects the direction in which the peripheral device 18 is being pointed based on a three-dimensional location of the tracking object of the first motion controller 20 and a two-dimensional location of the tracking object of the second motion controller 22. The three-dimensional location of the tracking object of the first motion controller 20 is determined based on a combination of image analysis of the captured image stream to detect its tracking object as well as data from the first motion controller's motion sensors. Whereas in one embodiment, the two-dimensional location of the tracking object of the second motion controller 22 can be determined based on image analysis of the captured image stream only. In another embodiment, the determination of the two-dimensional location of the tracking object of the second motion controller 22 is also based on data from the second motion controller's motion sensors. The determined direction of the peripheral device is provided to the video game 200 as input, and the video game updates its status accordingly, providing audio/video data 202 to display 12, and tactile feedback data 204 to the motion controllers.

As has been described, the direction in which the peripheral device 18 is being pointed can be determined based on the three-dimensional location of the tracking object of the first motion controller 20 and the two-dimensional location of the tracking object of the second motion controller 22 because the distance D between the tracking objects is a known quantity. In some embodiments, the vectoring module 240 utilizes the distance D to determine the peripheral device's direction. The distance D can be identified in various ways. In one embodiment, the distance D is stored by the identification module 30 of the peripheral device 18, and communicated to the console 10. In another embodiment, the console 10 determines the distance D based on a device ID of the peripheral device 18 communicated from the identification module 30. This can be performed by accessing stored information, either locally or remotely, which includes the distance D corresponding to the particular peripheral device ID.

In some embodiments, such as that described above with reference to FIG. 8, the distance D may change dynamically depending upon the configuration of the peripheral. In such embodiments, the distance D can be determined at the peripheral device based on its configuration and communicated to the console. In another embodiment, the current configuration of the peripheral device is communicated to the console, which then determines the distance D based on the current configuration.

In still other embodiments, the direction of the peripheral device is determined without reference to the actual distance D between tracking objects. Rather, a mapping or lookup table specific to the peripheral device that correlates positional information of the tracking objects to directional information is referenced by the vectoring module to determine the direction of the peripheral device. For example, in one embodiment, a mapping or lookup table correlates relative x-y positioning of tracking objects to angular orientation of the peripheral device. Then, based on the angular orientation, the specific direction of the peripheral device in the 3D gaming environment is determined based on the actual (x, y, z) positioning of the tracking object of the first motion controller.

Figure 10:
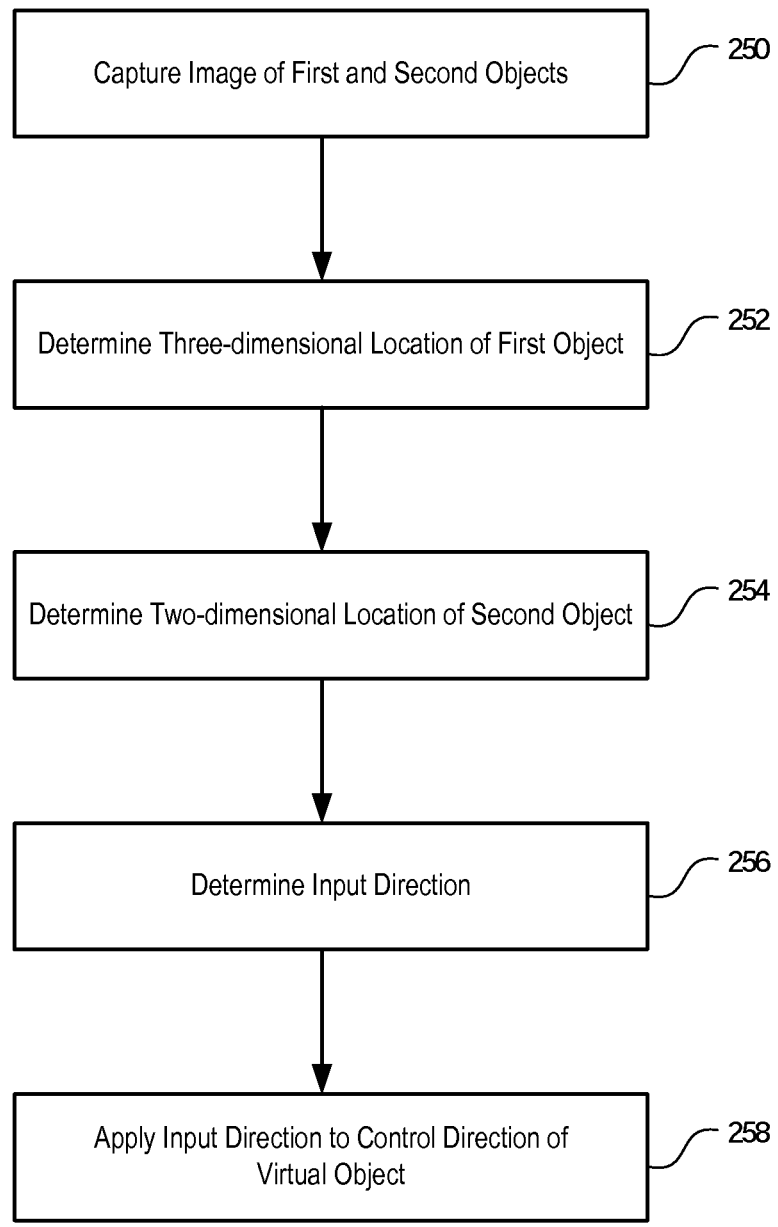
FIG. 10 illustrates a method for providing directional input to a video game, in accordance with an embodiment of the invention.

FIG. 10 illustrates a method for providing directional input to a video game, in accordance with an embodiment of the invention. The method initiates at operation 250 with capturing an image of a first object and a second object, the first object and the second object being defined at a fixed distance from each other. At operation 252, three-dimensional location of the first object is determined based on analysis of the captured image, and at operation 254, a two-dimensional location of the second object is determined based on analysis of the captured image. At operation 256, an input direction for a video game is determined based on the three-dimensional location of the first object and the two-dimensional location of the second object. At operation 258 the input direction is applied to control the direction of a virtual object within the video game.

The presently described embodiments demonstrate how directional input can be determined from tracked locations of tracking objects. According to the principles described herein, an existing controller device having a single tracking object can be enhanced via coupling of a second tracking object, such as an LED. This coupling enables significantly improved directional determination in accordance with techniques described herein. While specific embodiments have been provided to demonstrate various ways of coupling two tracking objects to facilitate directional input determination, these are described by way of example and not by way of limitation. Those skilled in the art having read the present disclosure will realize additional embodiments falling within the spirit and scope of the present invention.

Figure 11:
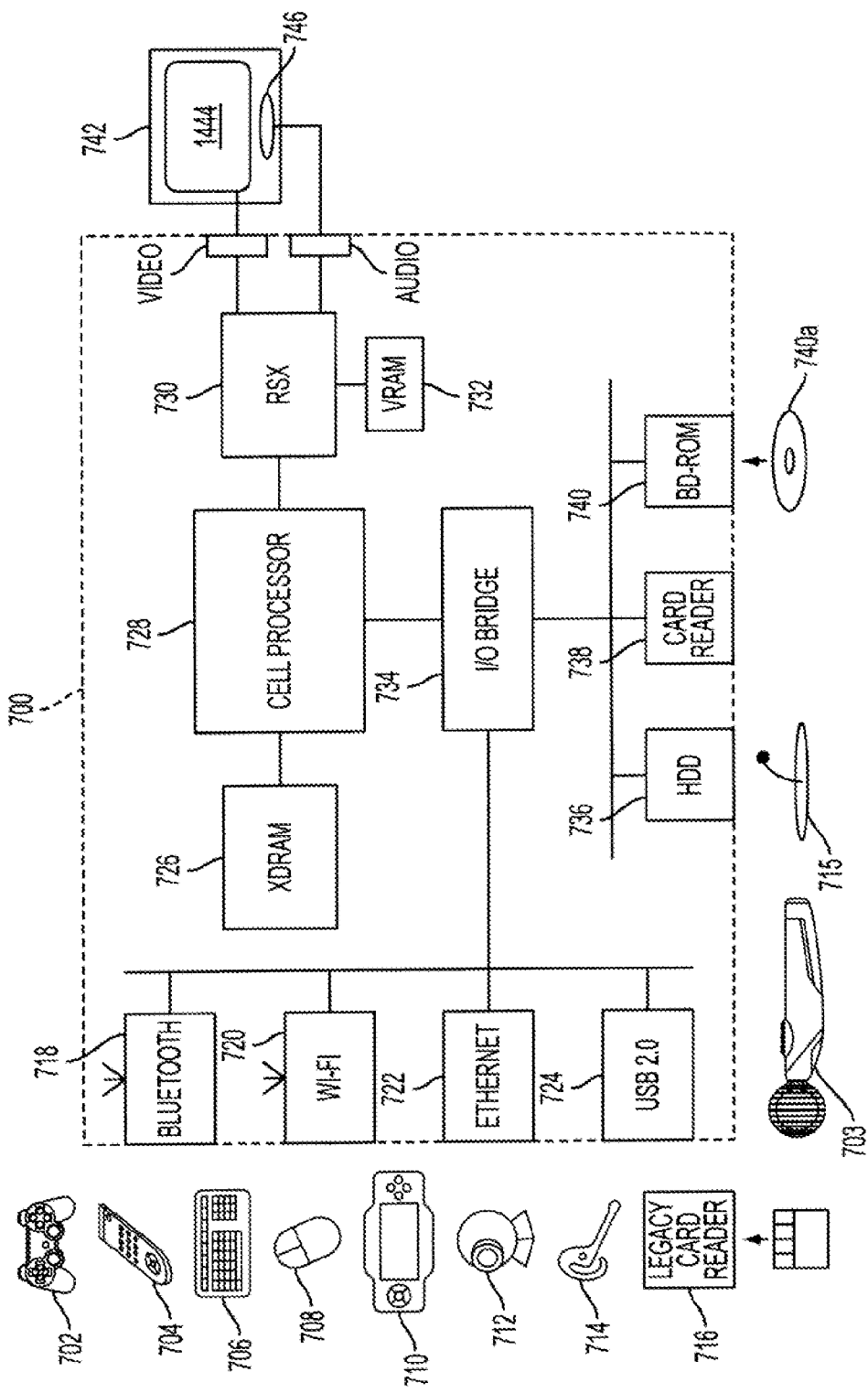
FIG. 11 illustrates hardware and user interfaces that may be used to provide interactivity with a video game, in accordance with one embodiment of the present invention.

FIG. 11 illustrates hardware and user interfaces that may be used to provide interactivity with a video game, in accordance with one embodiment of the present invention. FIG. 11 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 12:
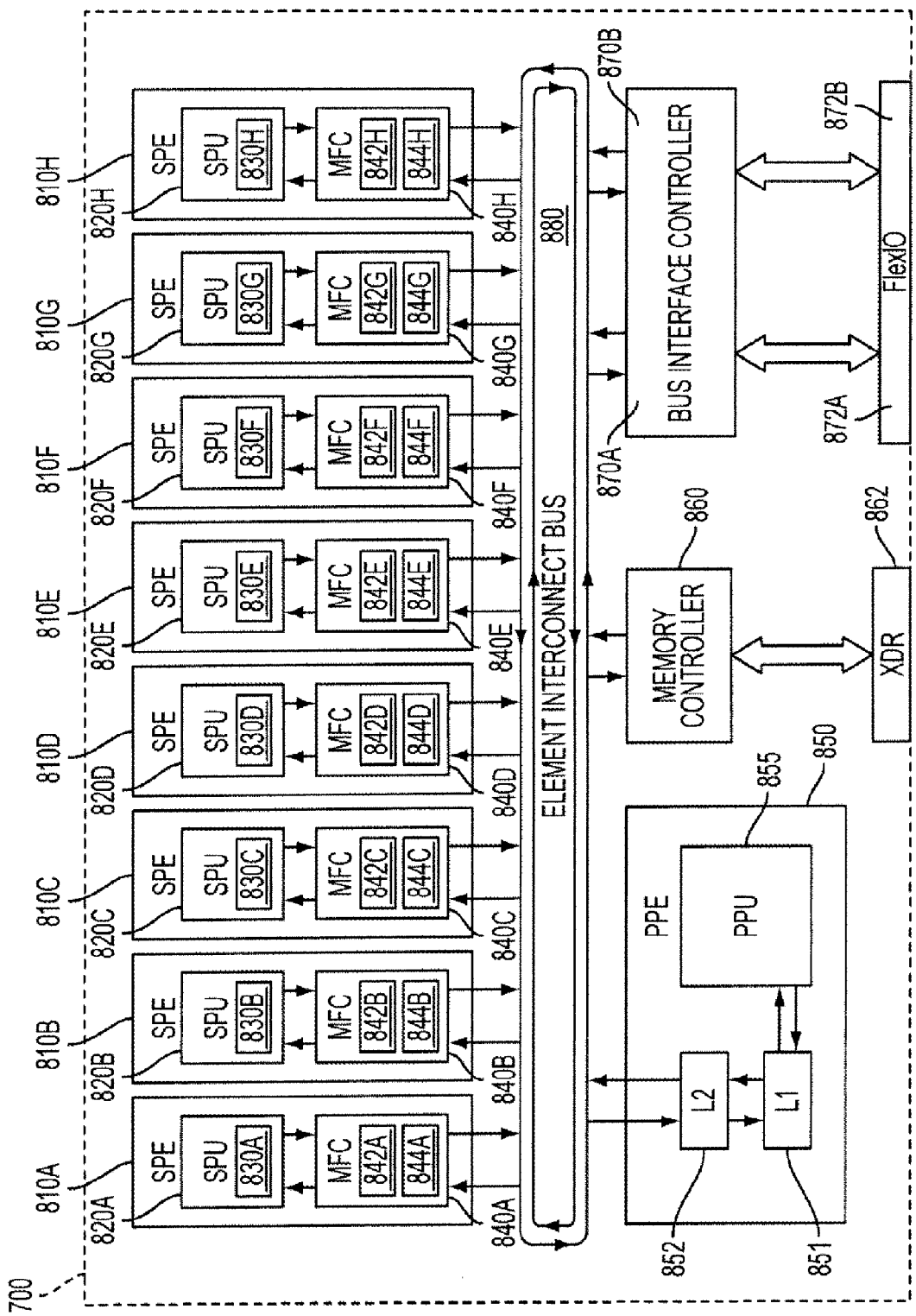
FIG. 12 illustrates additional hardware that may be used to process instructions, in accordance with one embodiment of the present invention.

FIG. 12 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 13:
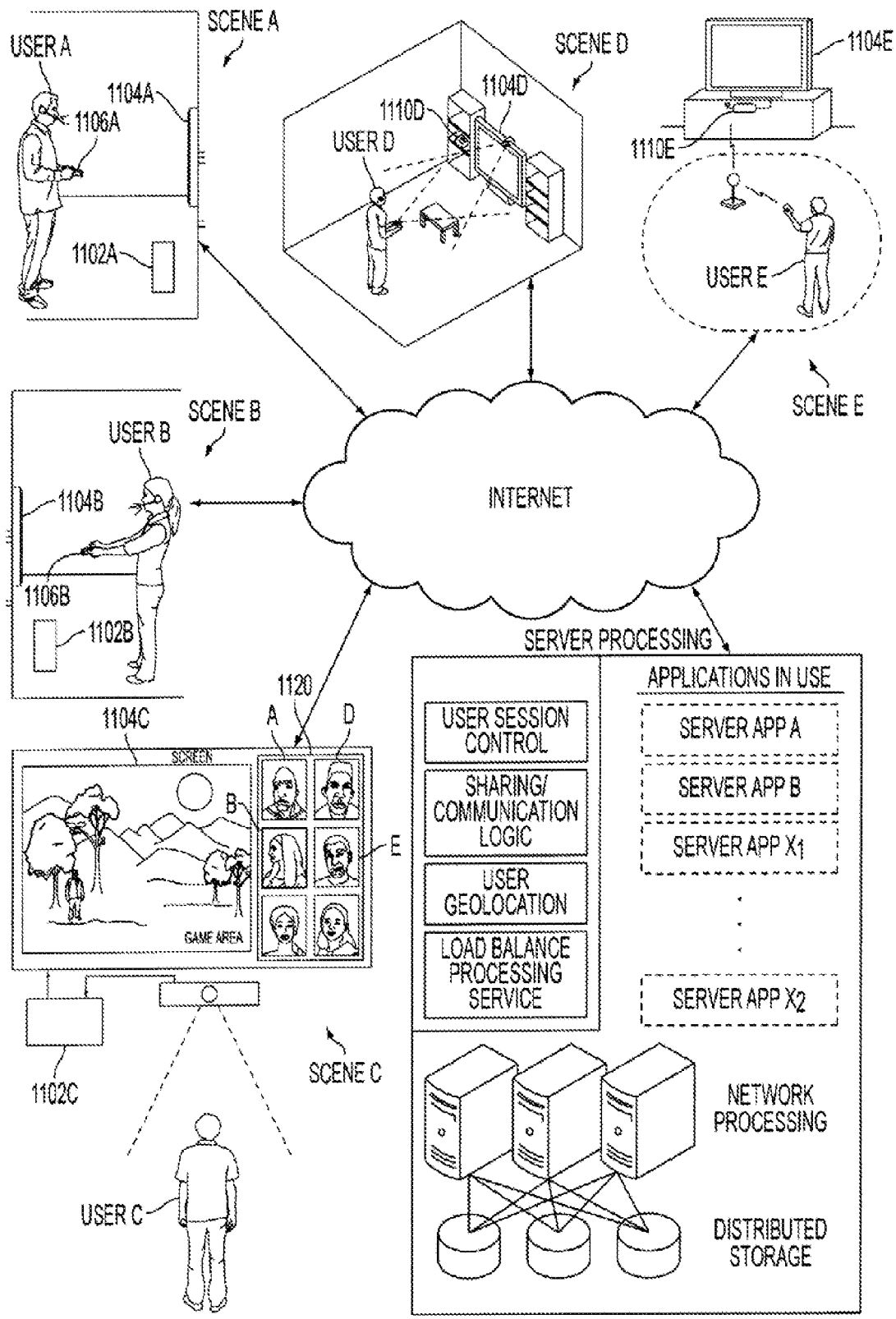
FIG. 13 is an exemplary illustration of scene A through scene E with respective user A through user E interacting with game clients 1102 that are connected to server processing via the internet, in accordance with one embodiment of the present invention.

FIG. 13 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 13, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 13 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 14:
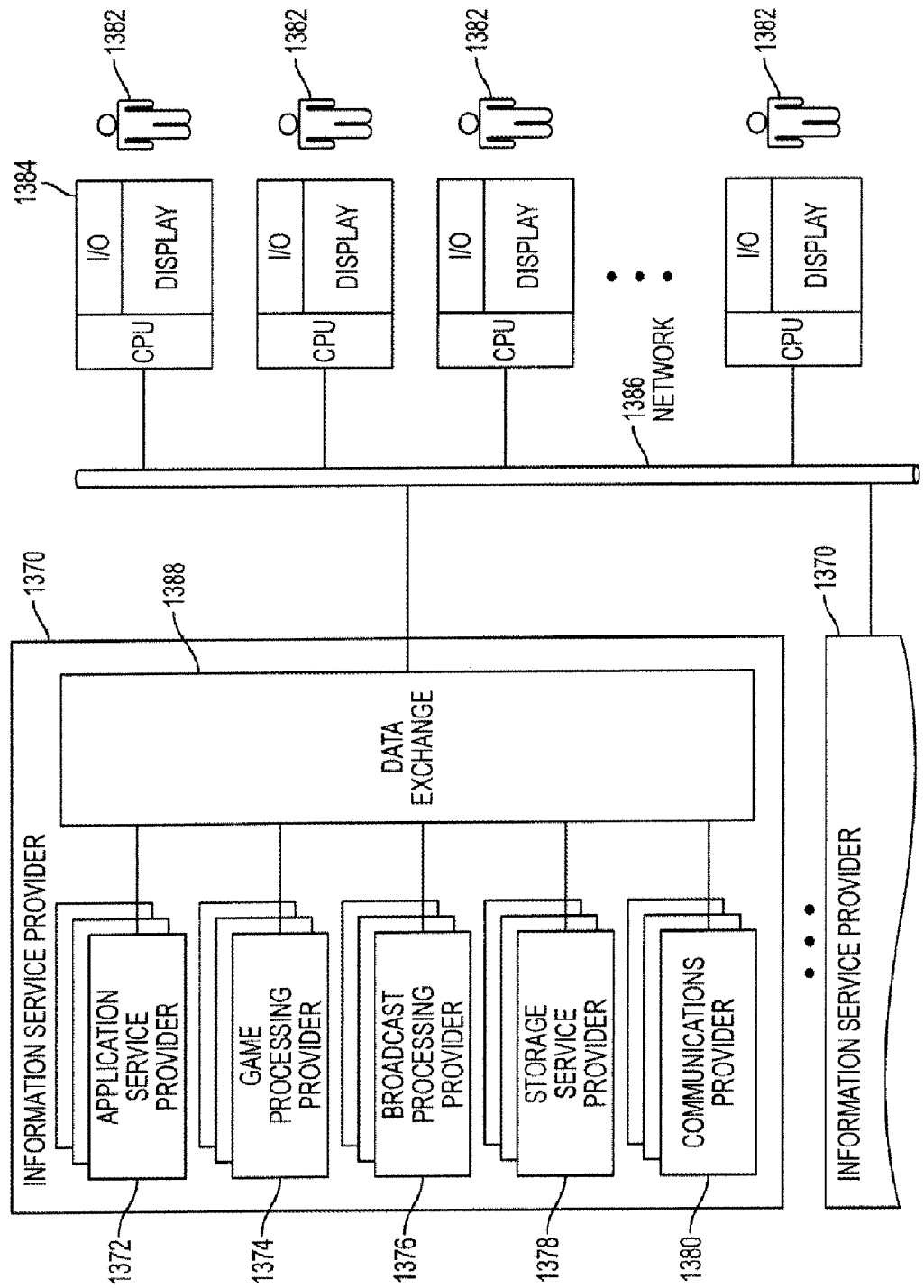
FIG. 14 illustrates an embodiment of an Information Service Provider architecture.

FIG. 14 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing directional input to a video game, comprising:
   capturing, by a camera, an image of a first object and a second object disposed on a housing of an input device, the first object defined at an end of a length of the housing, the second object defined along the length of the housing, the first object and the second object being defined at a fixed distance from each other on the input device, the camera being located proximate to a display;
   determining a three-dimensional location of the first object based on analysis of the captured image;
   determining a two-dimensional location of the second object based on analysis of the captured image;
   determining an input direction for a video game based on the three-dimensional location of the first object and the two-dimensional location of the second object, the input direction being towards the display and also the camera that is proximate to the display;
   wherein each of the operations of the method is executed by a processor.

2. The method for providing directional input to a video game according to claim 1,
   wherein determining the three-dimensional location of the first object includes determining a depth of the first object relative to an image capture device configured to capture the image of the first object and the second object; and
   wherein determining the two-dimensional location of the second object does not include determining a depth of the second object relative to the image capture device.

3. The method for providing directional input to a video game according to claim 1, further comprising,
   determining, based on the input direction, one or more of the following: a direction of a virtual object within the video game, a location on a display, a location within a virtual environment, a targeting direction, identifying a virtual object, identifying a menu selection.

4. The method for providing directional input to a video game according to claim 1, further comprising,
   repeating the capturing of the image and the determining of the three-dimensional location of the first object and the two-dimensional location of the second object so as to track the three-dimensional location of the first object and the two-dimensional location of the second object;
   repeating the determining of the input direction in accordance with the tracked three-dimensional location of the first object and two-dimensional location of the second object.

5. The method for providing directional input to a video game according to claim 1, further comprising,
   illuminating the first object and the second object.

6. The method for providing directional input to a video game according to claim 1, further comprising,
   determining a location of a virtual object in the video game based on the three-dimensional location of the first object.

7. The method for providing directional input to a video game according to claim 1,
   wherein determining the three-dimensional location of the first object includes capturing and analyzing inertial data selected from the group consisting of accelerometer data, gyroscope data, and magnetometer data.

8. A method for providing directional input to a video game, comprising:
   capturing, by an image capture device, an image of a first object and a second object, the first object defined at an end of a length of a housing of an input device, the second object defined along a length of the housing of the input device, the first object and the second object being defined at a fixed distance from each other and configured to be maintained at substantially different depths relative to the image capture device, the image capture device being located proximate to a display;
   determining a three-dimensional location of the first object based on analysis of the captured image;
   determining a two-dimensional location of the second object based on analysis of the captured image;
   determining an input direction for a video game based on the three-dimensional location of the first object and the two-dimensional location of the second object, the input direction being towards the display and also towards the image capture device that is proximate to the display;
   wherein each of the operations of the method is executed by a processor.

9. The method of claim 8, further comprising:
   detecting connection of a motion controller to a receptacle defined at the end of the housing;
   wherein the first object is connected to an end of the motion controller.

10. The method of claim 9,
    wherein determining the three-dimensional location of the first object includes analyzing inertial data detected by the motion controller, the inertial data being selected from the group consisting of accelerometer data, gyroscope data, and magnetometer data.

11. The method of claim 8, further comprising,
    determining, based on the input direction, one or more of the following: a direction of a virtual object within the video game, a location on a display, a location within a virtual environment, a targeting direction, identifying a virtual object, identifying a menu selection.

12. The method of claim 8, further comprising:
    repeating the capturing of the image and the determining of the three-dimensional location of the first object and the two-dimensional location of the second object so as to track the three-dimensional location of the first object and the two-dimensional location of the second object;

repeating the determining of the input direction in accordance with the tracked three-dimensional location of the first object and two-dimensional location of the second object.

13. The method of claim 8, further comprising, illuminating the first object and the second object.

14. A method for providing directional input to a video game, comprising:

capturing, by an image capture device located proximate to a display, images of an input device, the input device including a housing having a length, the input device including a first object defined at an end of the length of the housing and a second object defined along the length of the housing, wherein the first object and the second object are separated from each other by a fixed distance and are configured to be maintained at substantially different depths relative to the image capture device;

processing the captured images to track a location of the first object and a location of the second object;

determining and tracking an input direction based on the tracked location of the first object and the tracked location of the second object.

15. The method of claim 14, wherein the location of the first object is defined by three-dimensional data including a depth of the first object relative to the image capture device;

wherein the location of the second object is defined by two-dimensional data defining a lateral position of the second object relative to the image capture device.

16. The method of claim 14, wherein the input direction is towards the display and the image capture device that is proximate to the display.

17. The method of claim 14, wherein the input direction defines a direction of a virtual object in the video game.

18. The method of claim 17, wherein the virtual object is a weapon.

19. The method of claim 14, wherein the first object is connected to a motion controller, the motion controller connected to a receptacle defined at the end of the housing.

20. The method of claim 14, further comprising:

illuminating the first object and the second object;

wherein processing the captured images to track the location of the first object and the location of the second object includes identifying the illuminated first and second objects in the captured images.

* * * * *